United States Patent
Kim et al.

(10) Patent No.: US 10,586,952 B2
(45) Date of Patent: Mar. 10, 2020

(54) BATTERY MODULE COMPRISING CARTRIDGE HAVING GRIPPING PART

(71) Applicant: LG CHEM, LTD., Seoul (KR)

(72) Inventors: Gwan Woo Kim, Daejeon (KR); Hyo Chan Kim, Daejeon (KR); Jin Kyu Lee, Daejeon (KR); Sang Wook Yim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 131 days.

(21) Appl. No.: 15/313,928

(22) PCT Filed: Sep. 20, 2016

(86) PCT No.: PCT/KR2016/010446
§ 371 (c)(1),
(2) Date: Nov. 23, 2016

(87) PCT Pub. No.: WO2017/095003
PCT Pub. Date: Jun. 8, 2017

(65) Prior Publication Data
US 2017/0309869 A1    Oct. 26, 2017

(30) Foreign Application Priority Data

Dec. 4, 2015 (KR) .......................... 10-2015-0172156

(51) Int. Cl.
*H01M 2/02* (2006.01)
*H01M 2/10* (2006.01)
(Continued)

(52) U.S. Cl.
CPC ....... *H01M 2/0212* (2013.01); *H01M 2/0285* (2013.01); *H01M 2/0287* (2013.01);
(Continued)

(58) Field of Classification Search
CPC ........... H01M 10/0525; H01M 10/613; H01M 10/6555; H01M 10/6568; H01M 2220/20;
(Continued)

(56) References Cited

U.S. PATENT DOCUMENTS 8,703,322 B2    4/2014 Lee et al.
9,083,066 B2    7/2015 Ketkar et al.
(Continued)

FOREIGN PATENT DOCUMENTS

CN         102203980 A       9/2011
CN         203983363 U      12/2014
(Continued)

OTHER PUBLICATIONS

European Search Report for Appl. No. 16794917.1 dated Oct. 27, 2017.

*Primary Examiner* — Miriam Stagg
*Assistant Examiner* — Victoria H Lynch
(74) *Attorney, Agent, or Firm* — Birch, Stewart, Kolasch & Birch, LLP

(57) ABSTRACT

A battery module having a plurality of battery cells electrically connected to each other is disclosed. The battery module includes a plurality of cartridges, each of which includes a frame member, to opposite sides of which battery cells are mounted, each of the cartridges being provided at corners thereof with fastening parts, through which adjacent cartridges are coupled to each other in order to constitute a cartridge assembly, a pair of end plates mounted to opposite side surfaces of the cartridge assembly so as to cover outermost cartridges, and a busbar assembly mounted to one surface of the cartridge assembly, the busbar assembly including busbars for electrical connection between electrode terminals of the battery cells, wherein each of the cartridges is configured such that a cooling fin, with opposite (Continued)

surfaces of which the battery cells are in contact for thermal conduction, is mounted to the middle part of the cartridge, when viewed in vertical section, one end of the cooling fin being exposed outward from the cartridge, and gripping parts for mounting the battery cells in position are formed on the inner surface of the frame member of the cartridge.

19 Claims, 8 Drawing Sheets

(51) Int. Cl.
  *H01M 10/6555* (2014.01)
  *H01M 10/613* (2014.01)
  *H01M 10/6568* (2014.01)
  *H01M 10/0525* (2010.01)
(52) U.S. Cl.
  CPC ....... *H01M 2/1077* (2013.01); *H01M 2/1083* (2013.01); *H01M 10/0525* (2013.01); *H01M 10/613* (2015.04); *H01M 10/6555* (2015.04); *H01M 10/6568* (2015.04); *H01M 2/021* (2013.01); *H01M 2/024* (2013.01); *H01M 2/028* (2013.01); *H01M 2/1061* (2013.01); *H01M 2220/20* (2013.01)
(58) Field of Classification Search
  CPC .... H01M 2/021; H01M 2/0212; H01M 2/024; H01M 2/028; H01M 2/0285; H01M 2/0287; H01M 2/1061; H01M 2/1077; H01M 2/1083
  See application file for complete search history.

(56) References Cited

U.S. PATENT DOCUMENTS

| | | | |
|---|---|---|---|
| 2009/0305116 A1* | 12/2009 | Yang ................... | H01M 2/0212 429/61 |
| 2010/0215998 A1 | 8/2010 | Byun et al. | |
| 2011/0318623 A1 | 12/2011 | Lee et al. | |
| 2012/0040222 A1 | 2/2012 | Quick et al. | |
| 2012/0094166 A1 | 4/2012 | Lee et al. | |
| 2013/0164578 A1* | 6/2013 | Sweet ............... | H01M 10/0413 429/82 |
| 2013/0196195 A1* | 8/2013 | Nguyen ................. | H01M 2/12 429/82 |
| 2014/0147709 A1 | 5/2014 | Ketkar et al. | |
| 2014/0302383 A1* | 10/2014 | Amagai ................ | H01M 2/024 429/162 |
| 2016/0141712 A1 | 5/2016 | Choi et al. | |
| 2017/0047563 A1 | 2/2017 | Lee et al. | |

FOREIGN PATENT DOCUMENTS

| | | |
|---|---|---|
| JP | 2013-505535 A | 2/2013 |
| JP | WO2013/145917 A1 | 10/2013 |
| KR | 10-2010-0097404 A | 9/2010 |
| KR | 10-2015-0036897 A | 4/2015 |
| KR | 10-2015-0127357 A | 11/2015 |
| WO | WO 2014/084589 A1 | 6/2014 |
| WO | WO 2015/152639 A1 | 10/2015 |
| WO | WO 2015/170920 A1 | 11/2016 |

* cited by examiner

[FIG. 1]
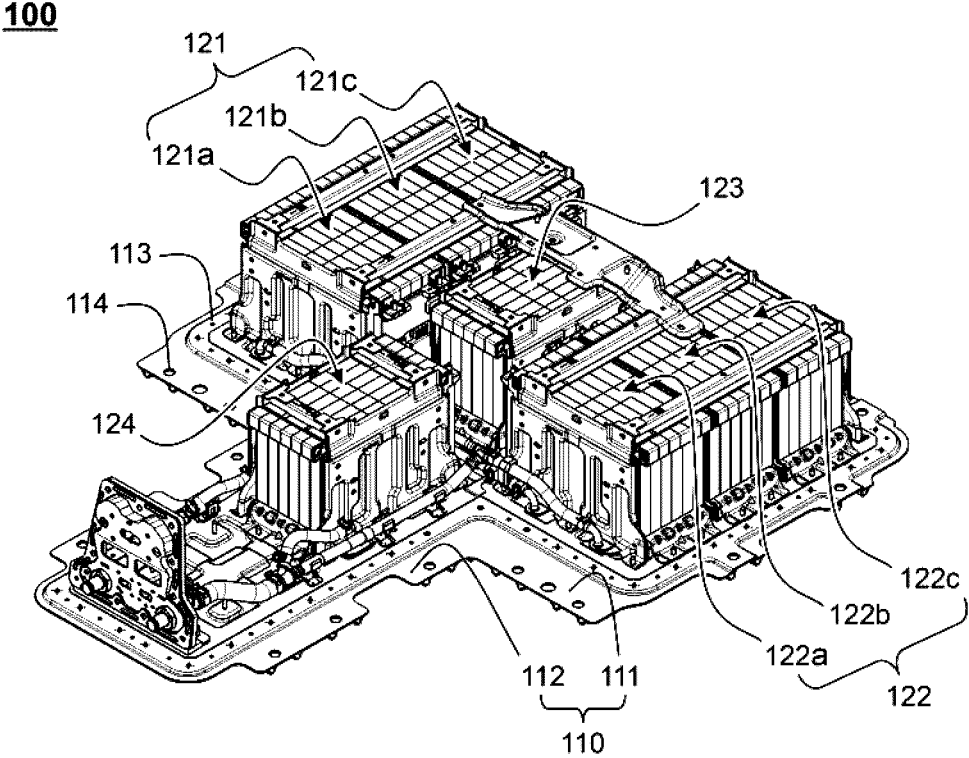

[FIG. 2]
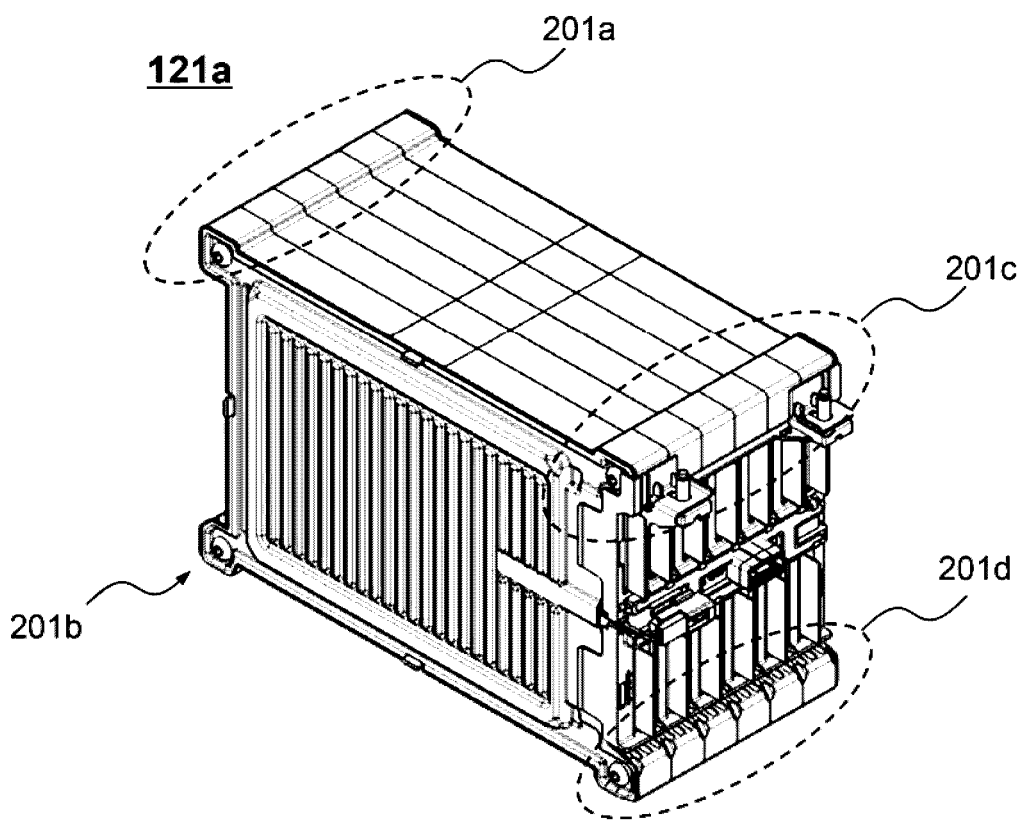

【FIG. 3】
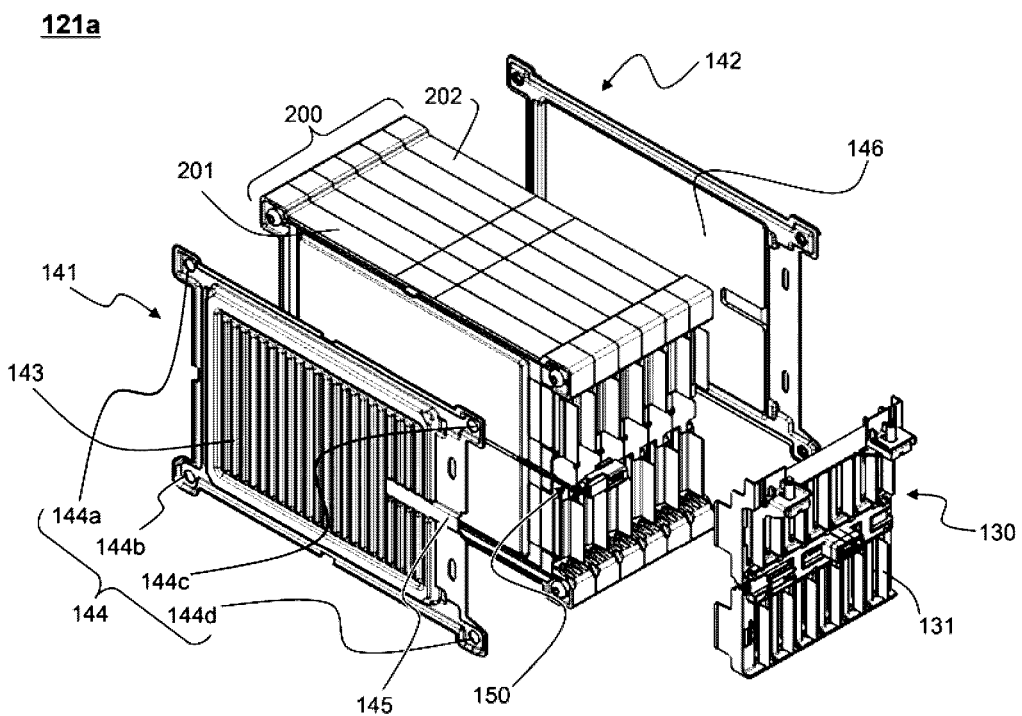

[FIG. 4]
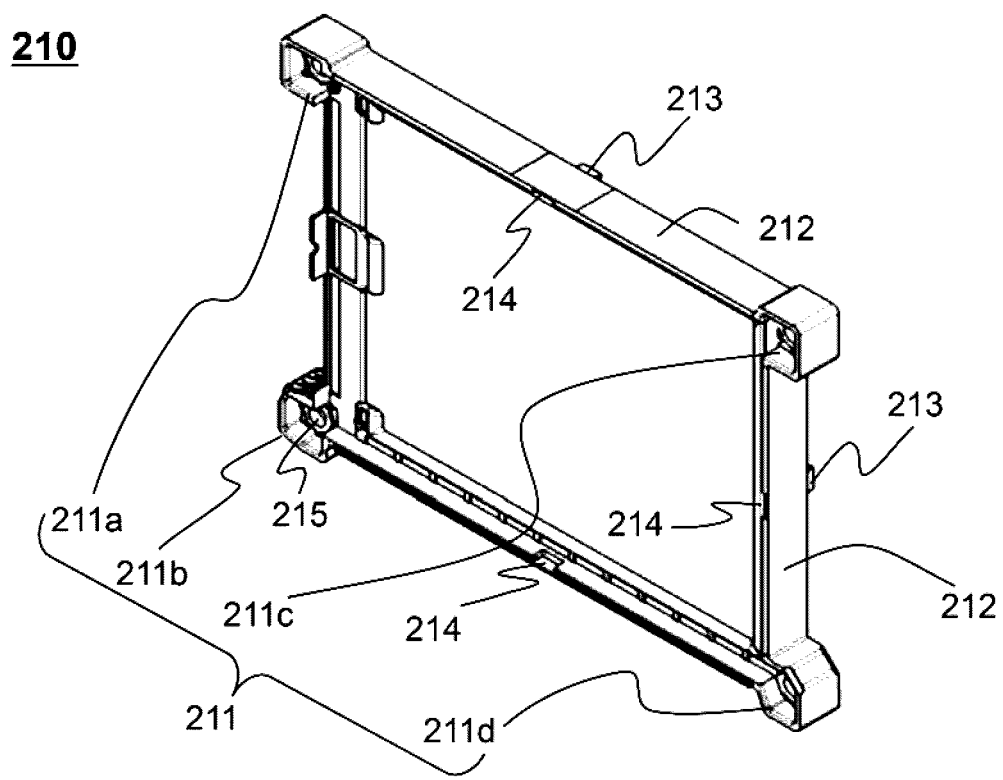

[FIG. 5]
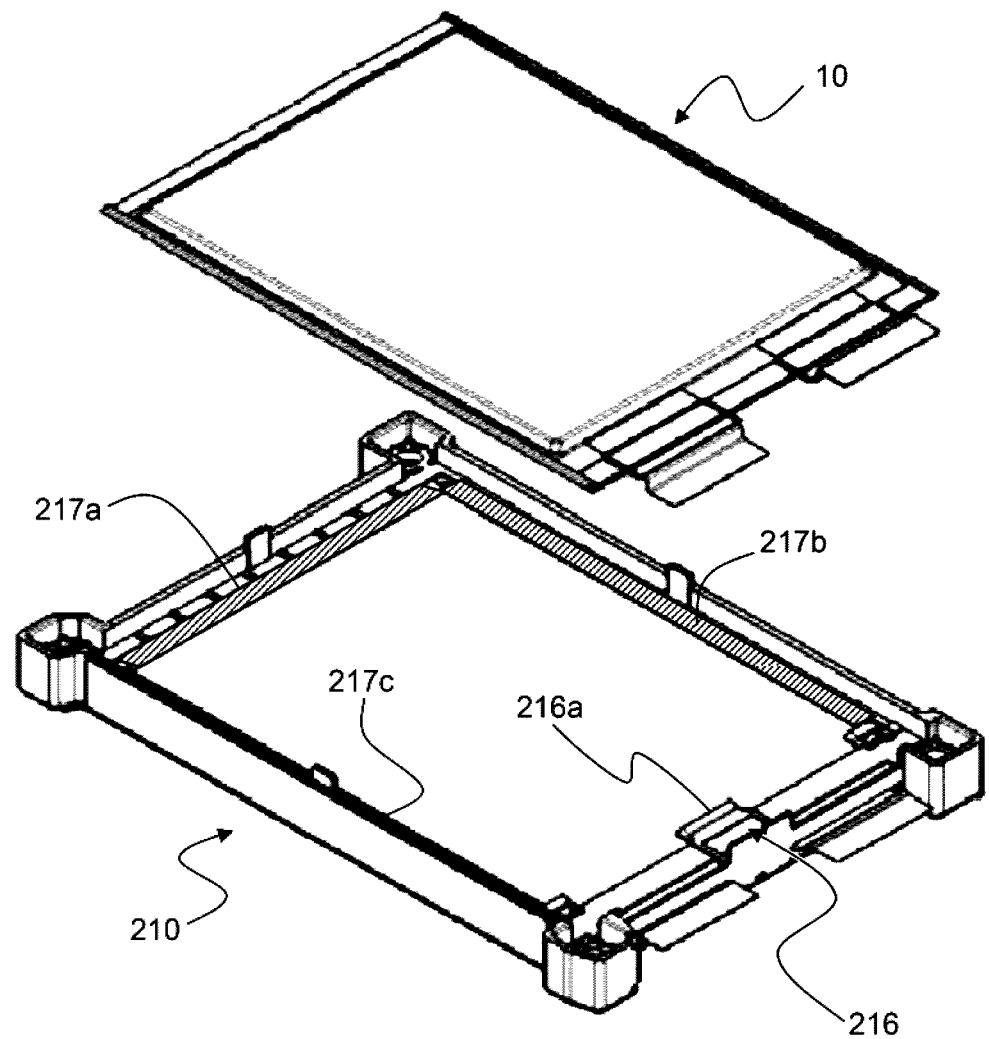

[FIG. 6]
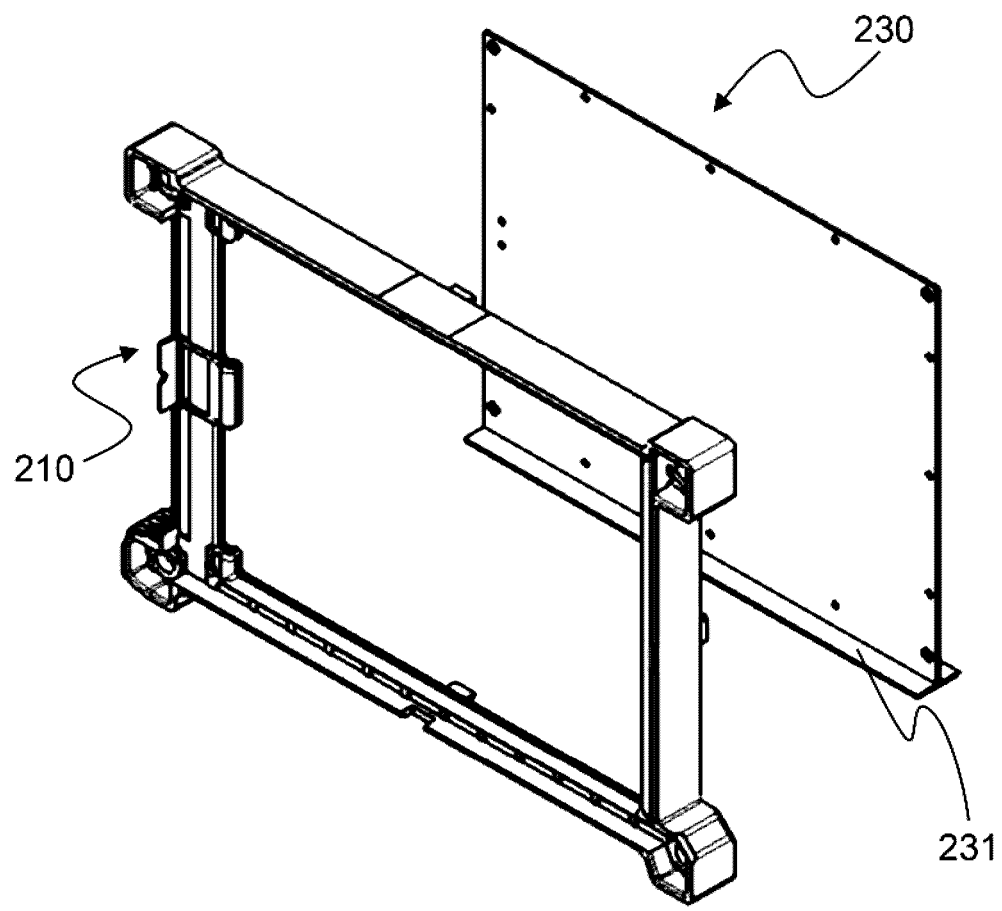

[FIG. 7]
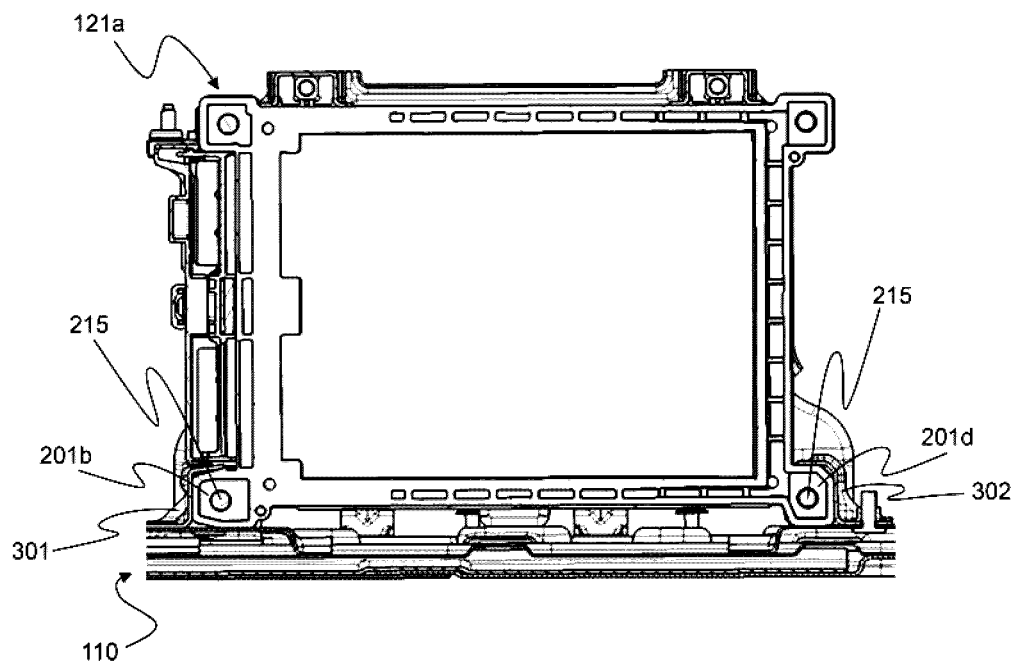

【FIG. 8】
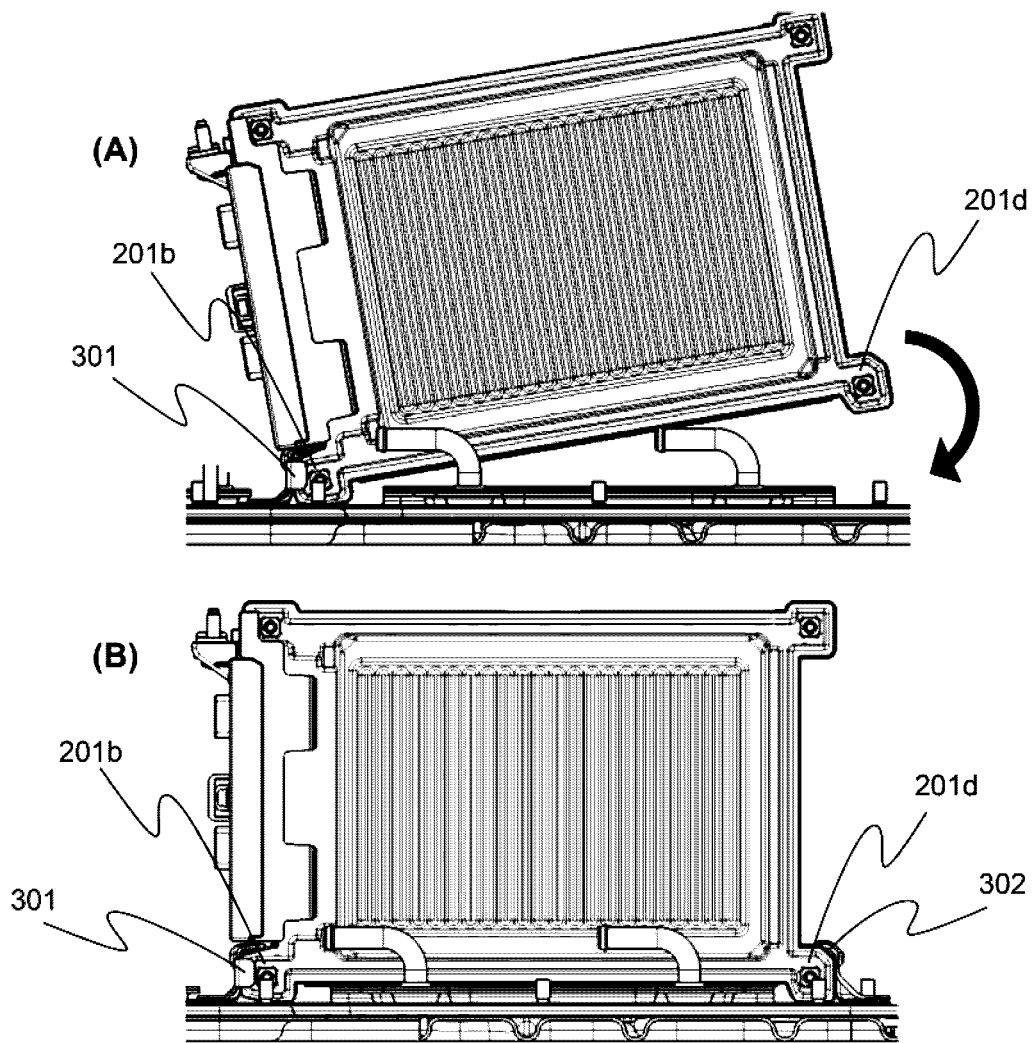

BATTERY MODULE COMPRISING CARTRIDGE HAVING GRIPPING PART

CROSS-REFERENCE TO RELATED APPLICATIONS

This application claims the benefit of Korean Patent Application No. 10-2015-0172156 filed on Dec. 4, 2015 with the Korean Intellectual Property Office, the disclosure of which is herein incorporated by reference in its entirety.

TECHNICAL FIELD

The present invention relates to a battery module including a cartridge having gripping parts formed on the inner surface of the frame member thereof to mount battery cells in position.

BACKGROUND ART

In recent years, as mobile devices have been increasingly developed and the demand for such mobile devices has increased, the demand for secondary batteries, which can be charged and discharged, as an energy source for such mobile devices has also sharply increased. As a result, much research has been carried out into a secondary battery that is capable of satisfying the wide variety of demands. In addition, the secondary battery has also attracted considerable attention as a power source for electric vehicles (EV), hybrid electric vehicles (HEV), and plug-in hybrid electric vehicles (PLUG-IN HEV), which have been developed to solve problems, such as air pollution, caused by existing gasoline and diesel vehicles, which use fossil fuels.

Consequently, electric vehicles (EV), which can be driven using only a secondary battery, and hybrid electric vehicles (HEV), which uses both a secondary battery and an engine, have been developed, and some of the electric vehicles (EV) and the hybrid electric vehicles (HEV) have now been commercialized. Nickel-metal hydride (Ni-MH) secondary batteries have been mainly used as a power source for the electric vehicles (EV) and the hybrid electric vehicles (HEV). In recent years, on the other hand, much research has also been carried out into lithium secondary batteries having high energy density, discharge voltage, and output stability, and some of the lithium secondary batteries have now been commercialized.

In the case in which such a secondary battery is used as a power source of a vehicle, the secondary battery is used as a battery pack including a plurality of battery modules or a battery module assembly.

The size and weight of a battery module is directly related to the accommodation space and output of a corresponding middle or large-sized device. For this reason, manufacturers are trying to manufacture battery modules that have as small a size and weight as possible while maintaining the same capacity. In addition, devices, such as an electric bicycle and an electric vehicle, which are subject to a large number of external impacts and vibrations, require stable electrical connection and physical coupling between components constituting the battery module. Furthermore, a plurality of battery cells is used to accomplish high output and large capacity; therefore, the safety of the battery module is regarded as important.

Preferably, a middle or large-sized battery module is manufactured so as to have as small a size and weight as possible. For this reason, a prismatic battery or a pouch-shaped battery cell, which can be stacked with high integration and has a small weight to capacity ratio, is usually used as a battery cell of a middle or large-sized battery module. In particular, much interest is currently focused on the pouch-shaped battery cell, which uses an aluminum laminate sheet as a sheathing member, because the pouch-shaped battery cell is lightweight and the manufacturing cost of the pouch-shaped battery cell is low.

Specifically, the mechanical strength of the pouch-shaped battery cell is low, with the result that additional members are required in order to stably maintain the coupled and assembled state of battery cells when the battery cells are stacked to manufacture a battery module. When the pouch-shaped battery cells are used to manufacture a battery module, an additional mounting member, such as a cartridge, to which one or more battery cells are mounted, is used. A plurality of mounting members is stacked to manufacture a battery module.

However, in the case in which the battery cells are not mounted in position to the cartridge or in the case in which the state in which the battery cells are mounted to the cartridge is not maintained due to the application of external force to a device, various problems, such as disconnection or a short circuit, may occur.

DISCLOSURE

Technical Problem

Therefore, the present invention has been made to solve the above problems and other technical problems that have yet to be resolved.

As a result of a variety of extensive and intensive studies and experiments to solve the problems described above, the inventors of the present application have developed a battery module having a specific structure. Specifically, it is an object of the present invention to provide a battery module having a specific structure in which battery cells are stably mounted in position when a battery module is assembled and in which the coupled and assembled state of the battery cells may be stably maintained when external force, such as vibration, is applied thereto.

Technical Solution

In accordance with one aspect of the present invention, the above and other objects can be accomplished by the provision of a battery module having a plurality of battery cells electrically connected to each other, the battery module including a plurality of cartridges, each of which includes a frame member, to opposite sides of which battery cells are mounted, each of the cartridges being provided at corners thereof with fastening parts, through which adjacent cartridges are coupled to each other in order to constitute a cartridge assembly, a pair of end plates mounted to opposite side surfaces of the cartridge assembly so as to cover outermost cartridges, and a busbar assembly mounted to one surface of the cartridge assembly, the busbar assembly including busbars for electrical connection between electrode terminals of the battery cells, wherein each of the cartridges is configured such that a cooling fin, with opposite surfaces of which the battery cells are in contact for thermal conduction, is mounted to the middle part of the cartridge, when viewed in vertical section, one end of the cooling fin being exposed outward from the cartridge, and gripping parts for mounting the battery cells in position are formed on the inner surface of the frame member of the cartridge.

Consequently, the battery module according to the present invention may be configured such that the cartridges, each of which has a specific structure, are stably coupled to each other, the battery cells are efficiently cooled, and the battery cells are stably mounted to the cartridges.

Various kinds of battery cells may be used in the battery module according to the present invention. For example, each of the battery cells may be configured to have a structure in which an electrode assembly is mounted in a pouch-shaped case made of a laminate sheet including a resin layer and a metal layer and in which a thermally bonded surplus portion is formed at the edge of the pouch-shaped case.

In a concrete example, the frame member of each of the cartridges may be provided with an outer wall, which is formed along the outer edge of the frame member so as to extend upward and downward from the cooling fin, when viewed in vertical section, in order to cover the battery cells mounted to the opposite sides of the frame member. In this structure, the battery cells may be more stably mounted to the opposite sides of the frame member. For example, the outer wall of the frame member may have a height corresponding to the height of each of the battery cells.

In the above structure, the outer wall of the frame member may be provided on one side of the inner surface thereof with fastening protrusions for coupling with another frame member adjacent to the frame member, the fastening protrusions being configured to protrude outward, and the outer wall of the frame member may be provided on the other side of the inner surface thereof with fastening recesses, which correspond to the respective fastening protrusions.

In a concrete example, the fastening parts of the frame member may protrude outward from the outer edge of the frame member, and each of the fastening parts may be provided in the middle part thereof with a fastening hole. As will be described below, this structure has advantages in that the coupling between the frame members is achieved and in that when the battery module is mounted on the base plate in order to manufacture the battery pack, easy assembly is achieved while a secure coupling state is provided.

For example, the frame member may be formed in a quadrangular planar shape, and each of the fastening parts may extend outward from two sides of the frame member adjacent to a corresponding one of the corners of the frame member so as to be formed in a quadrangular planar shape.

In a concrete example, the gripping parts may include a first gripping part formed on the region of the inner surface of the frame member in which the electrode terminals of each of the battery cells are located and at least one second gripping part formed on the region of the inner surface of the frame member in which the electrode terminals of each of the battery cells are not located.

In the above structure, the first gripping part may include a protrusion formed in the region of the inner surface of the frame member between the electrode terminals of each of the battery cells so as to protrude toward the battery cell.

Specifically, the protrusion of the first gripping part may be configured to be in tight contact with the outer surface of an electrode assembly receiving part of each of the battery cells. As a result, the state in which the battery cells are mounted to the frame member of the cartridge may be further stably maintained even when external force is applied thereto.

The second gripping part may be formed on the region of the inner surface of the frame member in which the electrode terminals of each of the battery cells are not located in the state of having a sufficient length to support a thermally bonded surplus portion of each of the battery cells.

By the provision of the first gripping part and the second gripping parts, the battery cells may be correctly mounted to the cartridge, and the coupled and assembled state thereof may be stably maintained when external force, such as impacts or vibrations, is applied thereto.

In a concrete example, the cooling fin may be integrally formed with the frame member by insert molding. In the case in which the cooling fin is integrally formed with the frame member, it is possible to greatly improve the efficiency of assembly of the battery module and to stably maintain the state in which the battery cells are in tight contact with the cooling fin, thereby improving the efficiency of heat dissipation.

The material for the cooling fin is not particularly restricted as long as the cooling fin exhibits high efficiency of heat dissipation. For example, the cooling fin may be made of a metal material, an inorganic material exhibiting high thermal conductivity, or a carbon material, and the cooling fin may be formed in a plate shape. One end of the cooling fin, configured to extend outward for heat conduction, may be configured to have, for example, a T-shaped structure so as to correspond to the shape of the outer surface of the frame member, when viewed in vertical section, such that the cooling fin is stably mounted to the frame member and the cooling fin exhibits high thermal conductivity Beads are formed on surfaces of the end plates, which are used in the battery module according to the present invention, and each of the end plates may be provided with fastening holes, which are formed so as to correspond to the fastening parts of each of the cartridges.

In a concrete example, an insulation plate exhibiting high thermal insulability may be interposed between each of the end plates and a corresponding one of the outermost cartridges, whereby it is possible to minimize the reduction in performance of the battery module attributable to the difference in temperature between the battery cells mounted to the outermost cartridges and the battery cells mounted to the other cartridges.

In addition, one of the end plates may be provided with a groove, in which a thermistor is mounted, whereby the temperatures of the battery cells may be effectively measured to control the operation of the battery cells.

In accordance with another aspect of the present invention, there is provided a battery pack including at least one battery module with the above-stated construction and a base plate, on the top surface of which the battery module is disposed.

In a concrete example, the base plate may include a first plate and a second plate, each of which may have a rectangular planar structure. The second plate may be connected to one relatively long side of the first plate.

That is, the base plate may be configured to have a structure in which the first plate and the second plate, each of which has a rectangular planar structure, are connected to each other such that the base plate has various shapes. Consequently, it is possible to configure the battery pack so as to have various shapes based on the structure of the base plate, whereby it is possible to easily overcome the limitations of the use of the inner space in a device in which the battery pack is installed.

In this case, the second plate may be connected to the middle region of one relatively long side of the first plate.

In a concrete example, the battery module may be disposed on the base plate in the direction in which the battery cells of the battery module are perpendicular to the base plate.

The neighboring fastening parts of the cartridges of the battery module may constitute fastening stack parts of the cartridge assembly. Consequently, the battery pack may be configured to have a structure in which two of the fastening stack parts are coupled to the base plate via hold-down brackets.

In the above structure, the hold-down brackets may include a first hold-down bracket for fixing the first fastening stack part of the cartridge assembly and a second hold-down bracket for fixing the second fastening stack part of the cartridge assembly.

Specifically, the first hold-down bracket may be coupled to the base plate by welding, and the second hold-down bracket may be coupled to the base plate using a bolt or a screw.

Consequently, the first fastening stack part may be inserted into the first hold-down bracket such that the first fastening stack part is fixed by the first hold-down bracket in the state in which the battery module is inclined with respect to the base plate, and the second hold-down bracket may be fastened to the base plate such that the second fastening stack part is fixed by the second hold-down bracket in the state in which the battery module is in tight contact with the base plate so as to be parallel to the base plate, whereby the battery module is mounted on the base plate through more stable and easy assembly and fixing.

In a concrete example, a thermal pad for thermal contact with the cooling fin may be interposed between the battery module and the base plate.

In the above structure, the cooling fin in the battery module may be in contact with, for example, a heat dissipation system mounted on the base plate via the thermal pad so as to achieve high thermal conductivity, thereby maximizing the efficiency of heat dissipation.

In accordance with a further aspect of the present invention, there is provided a device including the battery pack. The device may be any one selected from the group of an electric vehicle, a hybrid electric vehicle, and a plug-in hybrid electric vehicle.

Due to the specific structure of the battery module described above, therefore, the coupled state of the battery module may be stably maintained even when vibrations are generated from the device during the operation of a battery pack including the battery module or when external force, such as impact, is applied to the device.

Meanwhile, the battery pack may be installed in a vehicle in a manner such that the battery pack is isolated from the passenger compartment of the vehicle.

If short circuits occur in battery cells constituting the battery pack due to exposure of the battery pack to a high-temperature environment or malfunction of the battery pack, an electrolyte is decomposed at a positive electrode interface of each battery cell, with the result that a large amount of gas is generated, whereby the internal pressure of each battery cell is increased. As a result, a battery case of each battery cell may be ruptured, and the gas may be discharged out of each battery cell.

In general, the internal gas of each battery cell contains a toxic component, such as carbon monoxide, which is harmful to humans. As a result, a safety-related problem occurs.

However, the battery pack including the battery module according to the present invention is disposed in a vehicle so as to be isolated from the passenger compartment of the vehicle, whereby it is possible to prevent the occurrence of a phenomenon in which the internal gas of each battery cell is introduced into the interior of the vehicle, thereby solving a safety-related problem.

The structure and manufacturing method of the devices and apparatuses are well known in the art to which the present invention pertains, and a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a partial perspective view showing a battery pack including battery modules disposed on a base plate according to an embodiment of the present invention;

FIG. 2 is a perspective view showing a battery module according to an embodiment of the present invention;

FIG. 3 is an exploded perspective view showing the battery module of FIG. 2;

FIG. 4 is a perspective view showing a frame member;

FIG. 5 is a perspective view schematically showing a process of mounting a battery cell to the frame member;

FIG. 6 is a perspective view showing the frame member and a cooling fin;

FIG. 7 is a typical view showing the structure in which a battery module according to an embodiment of the present invention is disposed on the top surface of the base plate; and FIG. 8 is a typical view showing a process of disposing the battery module of FIG. 7 on the top surface of the base plate.

BEST MODE

FIG. 1 is a typical view schematically showing a battery pack including battery modules disposed on a base plate according to an embodiment of the present invention.

Referring to FIG. 1, a base plate 110 includes a first plate 111 and a second plate 112, each of which has a rectangular planar structure. The second plate 122 is connected to a middle region of one relatively long side of the first plate 111.

A plurality of first fastening holes 113, through which fastening members are inserted such that a pack cover (not shown) is coupled to the base plate 110, and a plurality of second fastening holes 114, through which fastening members are inserted such that the battery pack 100 is mounted and fixed to a device (not shown) are formed in the outer edge of the base plate 110.

Battery module groups 121, 122, 123, and 124 include a fourth battery module group 124 and a third battery module group 123, each of which is configured such that battery cells are arranged perpendicular to the direction in which the second plate 112 is connected to the first plate 111, and a first battery module group 121 and a second battery module group 122, each of which is configured such that battery cells are arranged parallel to the direction in which the second plate 112 is connected to the first plate 111.

The fourth battery module group 124 is disposed on the second plate 112, and the third battery module group 123 is disposed on the first plate 111 so as to be opposite the fourth battery module group 124.

The first battery module group 121 and the second battery module group 122 are disposed on the opposite side regions of the first plate 111 so as to be disposed at opposite sides of the third battery module group 123 in the state of being separated from each other.

The fourth battery module group 124 and the third battery module group 123 are each constituted by a single battery module. The first battery module group 121 is constituted by a battery module assembly including three battery modules 121a, 121b, and 121c, which are arranged adjacent to each other. The second battery module group 122 is constituted by a battery module assembly including three battery modules 122a, 122b, and 122c, which are arranged adjacent to each other.

FIG. 2 is a perspective view showing the structure of a battery module according to an embodiment of the present invention, and FIG. 3 is an exploded perspective view showing the battery module of FIG. 2.

Referring to FIGS. 2 and 3, a battery module 121a includes a cartridge assembly 200, which includes a plurality of cartridges, a pair of end plates 141 and 142 mounted to opposite side surfaces of the cartridge assembly 200 so as to cover the outermost cartridges 201 and 202, and a busbar assembly 130 mounted to one surface of the cartridge assembly 200.

Referring to FIG. 4, which is a side view showing a frame member, together with FIGS. 2 and 3, the cartridge assembly 200 includes a plurality of cartridges. Each cartridge includes a frame member 210, to which battery cells are mounted. Fastening parts 211a, 211b, 211c, and 211d are formed at corners of the frame member 210 such that adjacent cartridges can be coupled to each other through the fastening parts 211a, 211b, 211c, and 211d in order to constitute the cartridge assembly 200.

Beads 143 are formed on the surfaces of the end plates 141 and 142. Each of the end plates 141 and 142 is provided with fastening holes 144a, 144b, 144c, and 144d, through which the end plates 141 and 142 are coupled to the cartridge assembly and which are formed so as to correspond respectively to the fastening parts 211a, 211b, 211c, and 211d.

Between each of the end plates 141 and 142 and a corresponding one of the outermost cartridges 201 and 202 is interposed an insulation plate 146 exhibiting high thermal insulability in order to minimize the reduction in performance of the battery module due to the difference in temperature between the battery cells mounted to the outermost cartridges 201 and 202 and the battery cells mounted to the other cartridges.

In addition, the end plate 141 is provided with a groove 145, in which a thermistor 150 is mounted such that the temperatures of the battery cells are effectively measured to control the operation of the battery cells.

The busbar assembly 130 is configured to have a structure in which busbars 131 for electrical connection between electrode terminals of the battery cells are mounted to an insulative frame member.

FIG. 5 is a perspective view showing a process of mounting a battery cell to the frame member, and FIG. 6 is a perspective view showing the frame member and a cooling fin.

Referring to FIGS. 5 and 6 together with FIG. 4, the frame member 210 is formed in a quadrangular planar shape, and each fastening part 211 extends outward from two sides of the frame member adjacent to a corresponding one of the corners of the frame member so as to be formed in a quadrangular planar shape. In addition, the frame member 210 is provided with an outer wall 212, which is formed along the outer edge of the frame member 210 so as to extend upward and downward from a cooling fin 230, when viewed in vertical section, in order to cover the battery cells 10 mounted to the opposite sides of the frame member 210, whereby the battery cells 10 may be more stably mounted to the opposite sides of the frame member 210. For reference, only one battery cell 10 is shown in FIG. 5 for simplicity.

Fastening protrusions 213 for coupling with another frame member (not shown) adjacent to the frame member 210 are formed on one side of the inner surface of the outer wall 212 of the frame member 210 so as to protrude outward, and fastening recesses 214, which correspond to the respective fastening protrusions 213, are formed in the other side of the inner surface of the outer wall 212 of the frame member 210.

The fastening parts 211 of the frame member 210 protrude outward from the outer edge of the frame member 210. A fastening hole 215 is formed in the middle part of each of the fastening parts 211.

The above structure has advantages in that the coupling between the frame members 210 is achieved and in that when the battery module 121a (see FIG. 1) is mounted on the base plate 110 (see FIG. 1) in order to manufacture the battery pack 100 (see FIG. 1), easy assembly is achieved while a secure coupling state is provided.

Gripping parts 216, 217a, 217b, and 217c are formed on the inner surface of the frame member 210. The first gripping part 216 is formed on the region of the inner surface of the frame member 210 in which the electrode terminals of the battery cell 10 are located, and the second gripping parts 217a, 217b, and 217c are formed on the regions of the inner surface of the frame member 210 in which the electrode terminals of the battery cell 10 are not located so as to extend along the outer edge of the battery cell 10.

As previously described, the first gripping part 216 includes a protrusion 216a formed in the region of the inner surface of the frame member 210 between the electrode terminals of the battery cell 10 so as to protrude toward the battery cell 10. The protrusion 216a of the first gripping part 216 is configured to be in tight contact with the outer surface of an electrode assembly receiving part of the battery cell.

The second gripping parts 217a, 217b, and 217c are formed to have sufficient lengths to support thermally bonded surplus portions of the battery cell. The second gripping parts 217a, 217b, and 217c are formed on the regions of the inner surface of the frame member 210 in which the electrode terminals of the battery cell are not located.

In the above structure, the battery cell 10 is correctly mounted to the cartridge, and the coupled and assembled state thereof is stably maintained when external force, such as impacts or vibrations, is applied thereto, by the provision of the first gripping part and the second gripping parts 217a, 217b, and 217c.

The cooling fin 230 is integrally formed with the frame member 210 by insert molding. One end 231 of the cooling fin 230 extends outward so as to be exposed outside the cartridge such that the cooling fin 230 performs heat conduction. In order to stably mount the cooling fin 230 and to improve the thermal conductivity of the cooling fin 230, the end 231 of the cooling fin 230 is configured to have a T-shaped structure so as to correspond to the shape of the outer surface of the frame member 210, when viewed in vertical section.

FIG. 7 is a typical view showing the structure in which a battery module according to an embodiment of the present invention is disposed on the top surface of the base plate, and FIG. 8 is a typical view showing a process of disposing the battery module of FIG. 7 on the top surface of the base plate.

Referring to FIGS. 7 and 8, the battery module 121a is disposed on the base plate 110 in the direction in which the battery cells 10 of the battery module 121a are perpendicular to the base plate 110.

Referring to FIGS. 7 and 8 together with FIG. 2, the neighboring fastening parts of the cartridges 210 of the battery module 121a constitute fastening stack parts 201a, 201b, 201c, and 201d of the cartridge assembly.

The fastening stack parts 201b and 201d, which are in contact with the base plate 110, among the fastening stack parts 201a, 201b, 201c, and 201d, are coupled to the base plate 110 via hold-down brackets 301 and 302, respectively.

The first hold-down bracket 301 fixes the first fastening stack part 201b, and the second hold-down bracket 302 fixes the second fastening stack part 201d. The first hold-down bracket 301 is coupled to the base plate 110 by welding, and the second hold-down bracket 302 is coupled to the base plate 110 using bolts or screws.

As shown in FIG. 8(A), the first fastening stack part 201b is inserted into the first hold-down bracket 301 such that the first fastening stack part 201b is fixed by the first hold-down bracket 301 in the state in which the battery module is inclined with respect to the base plate. As shown in FIG. 8(B), the second hold-down bracket 302 is fastened to the base plate 110 such that the second fastening stack part 201d is fixed by the second hold-down bracket 302 in the state in which the battery module is in tight contact with the base plate so as to be parallel to the base plate.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery module is configured such that cartridges, each of which has a specific structure, are stably coupled to each other, battery cells are efficiently cooled, and the battery cells are stably mounted to the cartridges.

The invention claimed is:

1. A battery module comprising:
a plurality of battery cells electrically connected to each other, wherein each battery cell has a pair of electrode terminals extending from a first side of the battery cell, the first side extending in a first direction, and a second side perpendicular to the first side and extending in a second direction, the plurality of battery cells being stacked in a third direction;
a plurality of cartridges, each of which comprises a frame member having an inner circumferential edge and forming a compartment housing one of the plurality of battery cells, the electrode terminals spaced from each other in the first direction by a first distance, each of the plurality of cartridges being provided at corners thereof with fastening parts, through which adjacent cartridges are coupled to each other in order to constitute a cartridge assembly;
a pair of end plates mounted to opposite side surfaces of the cartridge assembly so as to cover outermost cartridges; and
a busbar assembly mounted to one surface of the cartridge assembly, the busbar assembly comprising busbars for electrical connection between the electrode terminals of the plurality of battery cells,
wherein each of the plurality of cartridges is configured such that a cooling fin, with opposite surfaces of which the plurality of battery cells are in contact for thermal conduction, is mounted to a middle part of each of the plurality of cartridges, when viewed in vertical section, one end of the cooling fin being exposed outward from each of the plurality of cartridges, and gripping parts for mounting each of the plurality of battery cells in position are formed on an inner surface of the frame member of each of the plurality of cartridges,
wherein the gripping parts comprise a first gripping part formed on a region of the inner surface of the frame member in which the electrode terminals of each of the plurality of battery cells are located and at least one second gripping part formed on a region of the inner surface of the frame member in which the electrode terminals of each of the plurality of battery cells are not located,
wherein the first gripping part comprises a protrusion formed on a first side of the frame member between the electrode terminals of each of the plurality of battery cells and extending in the second direction from the inner circumferential edge so as to protrude into the compartment toward the battery cell,
wherein a width of the first gripping part in the first direction is less than the first distance, and
wherein the protrusion of the first gripping part contacts an outer surface of an electrode assembly receiving part of the battery cell.

2. The battery module according to claim 1, wherein each of the plurality of battery cells is configured to have a structure in which an electrode assembly is mounted in a pouch-shaped case made of a laminate sheet comprising a resin layer and a metal layer and in which a thermally bonded surplus portion is formed at an edge of the pouch-shaped case.

3. The battery module according to claim 1, wherein the frame member of each of the plurality of cartridges is provided with an outer wall, which is formed along an outer edge of the frame member so as to extend upward and downward from the cooling fin, when viewed in vertical section, in order to cover the plurality of battery cells mounted to the opposite sides of the frame member.

4. The battery module according to claim 3, wherein the outer wall of the frame member has a height corresponding to a height of each of the plurality of battery cells.

5. The battery module according to claim 3, wherein the outer wall of the frame member is provided on one side of an inner surface with fastening protrusions for coupling with another frame member adjacent to the frame member, the fastening protrusions being configured to protrude outward, and the outer wall of the frame member is provided on an opposite of the inner surface with fastening recesses, which correspond to the respective fastening protrusions.

6. The battery module according to claim 1, wherein the fastening parts of the frame member protrude outward from an outer edge of the frame member, and each of the fastening parts is provided in a middle part thereof with a fastening hole.

7. The battery module according to claim 1, wherein the frame member is formed in a quadrangular planar shape, and each of the fastening parts extends outward from two sides of the frame member adjacent to a corresponding one of the corners of the frame member so as to be formed in a quadrangular planar shape.

8. The battery module according to claim 1, wherein the at least one second gripping part supports a thermally bonded surplus portion of each of the plurality of battery cells.

9. The battery module according to claim 1, wherein the cooling fin is integrally formed with the frame member by insert molding.

10. The battery module according to claim 1, wherein the cooling fin is made of a metal material, an inorganic material exhibiting high thermal conductivity, or a carbon material, the cooling fin is formed in a plate shape, and one end of the cooling fin, configured to extend outward for heat conduction, is configured to have a T-shaped structure so as to correspond to a shape of an outer surface of the frame member, when viewed in vertical section.

11. The battery module according to claim 1, wherein beads are formed on surfaces of the end plates, and each of the end plates is provided with fastening holes, which are formed so as to correspond to the fastening parts of each of the plurality of cartridges.

12. The battery module according to claim 1, wherein an insulation plate exhibiting high thermal insulability is interposed between each of the end plates and a corresponding one of the outermost cartridges, and one of the end plates is provided with a groove, in which a thermistor is mounted.

13. A battery pack comprising at least one battery module according to claim 1 and a base plate, on a top surface of which the battery module is disposed.

14. The battery pack according to claim 13, wherein the battery module is disposed on the base plate in a direction in which the battery cells of the battery module are perpendicular to the base plate.

15. The battery pack according to claim 13, wherein the neighboring fastening parts of the cartridges of the battery module constitute fastening stack parts of the cartridge assembly, and two of the fastening stack parts are coupled to the base plate via hold-down brackets.

16. The battery pack according to claim 15, wherein
the hold-down brackets comprise a first hold-down bracket for fixing the first fastening stack part of the cartridge assembly and a second hold-down bracket for fixing the second fastening stack part of the cartridge assembly,
the first hold-down bracket is coupled to the base plate by welding, and
the second hold-down bracket is coupled to the base plate using a bolt or a screw.

17. The battery pack according to claim 16, wherein the first fastening stack part is inserted into the first hold-down bracket such that the first fastening stack part is fixed by the first hold-down bracket in a state in which the battery module is inclined with respect to the base plate, and the second hold-down bracket is fastened to the base plate such that the second fastening stack part is fixed by the second hold-down bracket in a state in which the battery module is in tight contact with the base plate so as to be parallel to the base plate, whereby the battery module is mounted on the base plate.

18. The battery pack according to claim 13, wherein a thermal pad for thermal contact with the cooling fin is interposed between the battery module and the base plate.

19. A device comprising a battery pack according to claim 13.

* * * * *